US009438689B2

(12) United States Patent
Iyer et al.

(10) Patent No.: US 9,438,689 B2
(45) Date of Patent: *Sep. 6, 2016

(54) METHOD AND SYSTEM TO DETERMINE A MEMBER PROFILE ASSOCIATED WITH A REFERENCE IN A PUBLICATION

(71) Applicant: LinkedIn Corporation, Mountain View, CA (US)

(72) Inventors: Anand R. Iyer, San Mateo, CA (US); Hyun Chul Lee, Mountain View, CA (US); Ryan Roslansky, Hillsborough, CA (US); Liqin Xu, San Jose, CA (US); Runfang Zhou, Sunnyvale, CA (US)

(73) Assignee: LinkedIn Corporation, Mountain View, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/494,271

(22) Filed: Sep. 23, 2014

(65) Prior Publication Data

US 2015/0032653 A1     Jan. 29, 2015

Related U.S. Application Data

(63) Continuation of application No. 13/945,733, filed on Jul. 18, 2013, now Pat. No. 8,849,813.

(51) Int. Cl.
*G06F 17/30* (2006.01)
*H04L 29/08* (2006.01)
*G06Q 50/00* (2012.01)
*G06Q 10/10* (2012.01)

(52) U.S. Cl.
CPC ....... *H04L 67/306* (2013.01); *G06F 17/30861* (2013.01); *G06Q 10/10* (2013.01); *G06Q 50/01* (2013.01)

(58) Field of Classification Search
None
See application file for complete search history.

(56) References Cited

U.S. PATENT DOCUMENTS

| 8,655,792 | B1 * | 2/2014 | Gauvin | G06F 17/30867 |
| | | | | 705/1.1 |
| 8,849,813 | B1 | 9/2014 | Iyer et al. | |
| 2009/0031245 | A1 * | 1/2009 | Brezina | H04M 15/00 |
| | | | | 715/781 |
| 2009/0157667 | A1 * | 6/2009 | Brougher | G06Q 10/063 |
| 2009/0319521 | A1 * | 12/2009 | Groeneveld | G06F 17/30657 |

(Continued)

OTHER PUBLICATIONS

"U.S. Appl. No. 13/945,733, Examiner Interview Summary mailed Jan. 31, 2014", 3 pgs.

(Continued)

*Primary Examiner* — Bai D. Vu
(74) *Attorney, Agent, or Firm* — Schwegman Lundberg & Woessner, P.A.

(57) ABSTRACT

Method and system are provided to determine a member profile associated with a reference to a person in a publication and may be used beneficially to identify members of a social network in news articles. The system may be configured to detect a publication that was shared by a member of an on-line social networking system, determine that the publication includes a name entity, and identify a member profile in the on-line social networking system that represents a member referenced by the name entity. The process of identifying a member profile in the on-line social networking system that represents a member referenced by the name entity may include building a list of candidate profiles from the member profiles of the on-line social networking system and selecting a matching profile from the candidate profiles, utilizing one or more disambiguation techniques.

20 Claims, 4 Drawing Sheets

(56) References Cited

U.S. PATENT DOCUMENTS

| | | | |
|---|---|---|---|
| 2011/0066954 A1* | 3/2011 | Zuber | G06Q 10/10 715/751 |
| 2011/0252340 A1* | 10/2011 | Thomas | G06Q 10/107 715/756 |
| 2012/0179972 A1* | 7/2012 | Hacid | G06F 17/30899 715/738 |
| 2012/0303557 A1* | 11/2012 | Lu | G06F 17/30616 706/12 |
| 2013/0080266 A1* | 3/2013 | Molyneux | G06Q 10/00 705/14.72 |
| 2013/0103758 A1* | 4/2013 | Alison | G06Q 50/01 709/204 |

OTHER PUBLICATIONS

"U.S. Appl. No. 13/945,733, Non Final Office Action mailed Oct. 24, 2013", 15 pgs.

"U.S. Appl. No. 13/945,733, Notice of Allowance mailed May 22, 2014", 15 pgs.

"U.S. Appl. No. 13/945,733, PTO Response to Rule 312 Communication mailed Aug. 22, 2014", 2 pgs.

"U.S. Appl. No. 13/945,733, Response filed Jan. 24, 2014 to Non Final Office Action mailed Oct. 24, 2013", 15 pgs.

"U.S. Appl. No. 13/945,733, 312 Amendment filed Aug. 15, 2014", 7 pgs.

* cited by examiner

METHOD AND SYSTEM TO DETERMINE A MEMBER PROFILE ASSOCIATED WITH A REFERENCE IN A PUBLICATION

CROSS-REFERENCE TO RELATED APPLICATION(S)

The present application is a continuation of U.S. patent application Ser. No. 13/945,733, filed Jul. 18, 2013, now U.S. Pat. No. 8,849,813, issued Sep. 30, 2014, which is incorporated herein by reference in its entirety.

TECHNICAL FIELD

This application relates to the technical fields of software and/or hardware technology and, in one example embodiment, to system and method to determine a member profile associated with a reference in a publication.

BACKGROUND

An on-line social network may be viewed as a platform to connect people in virtual space. An on-line social network may be a web-based platform, such as, e.g., a social networking web site, and may be accessed by a user via a web browser. An on-line social network may be a business-focused social network that is designed specifically for the business community, where registered members establish and document networks of people they know and trust professionally. Each registered member may be represented by a member profile. A member profile may be represented by one or more web pages. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
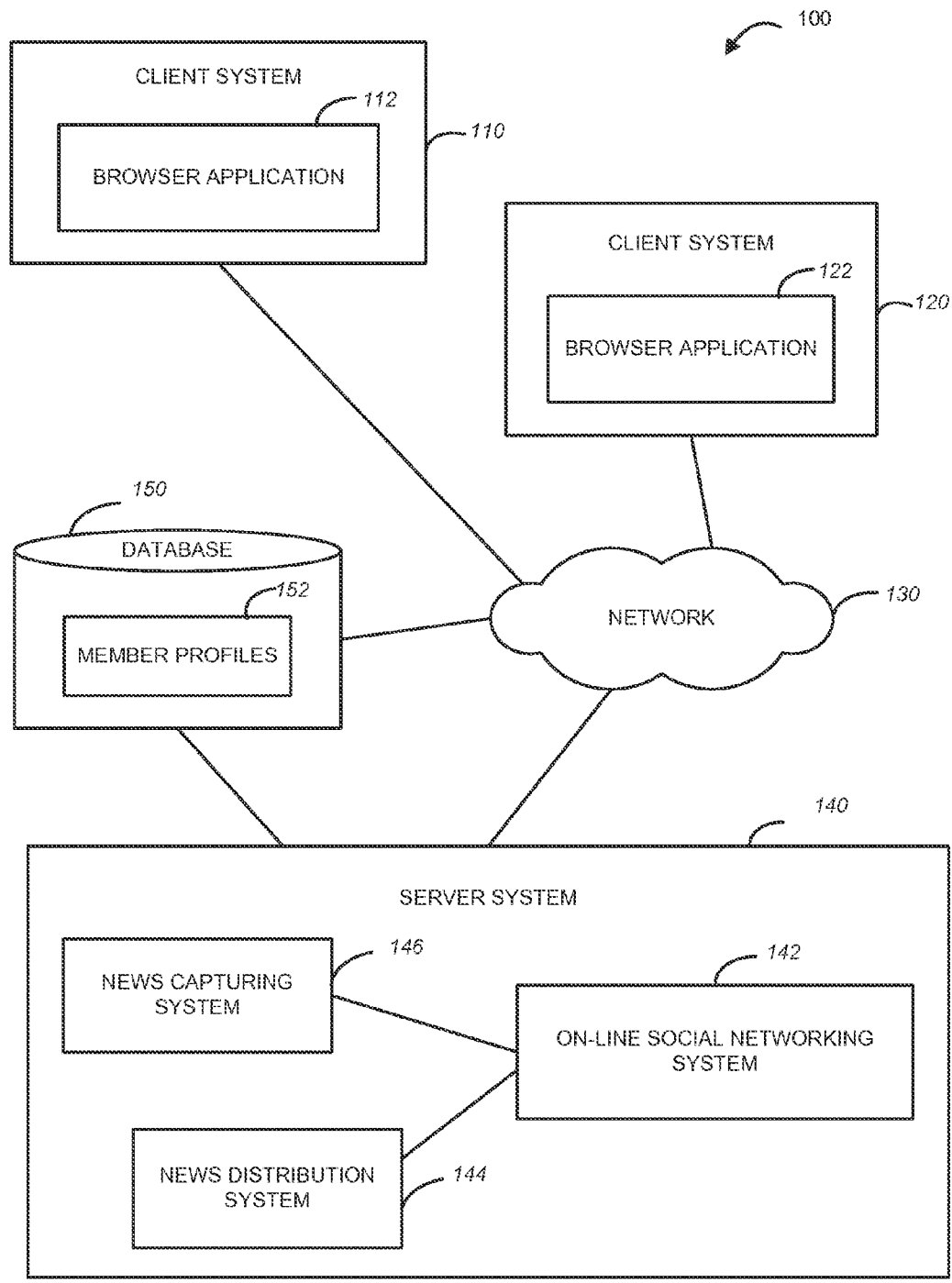
FIG. 1 is a diagrammatic representation of a network environment within which an example method and system to determine a member profile associated with a reference in a publication may be implemented.

A method and system to determine a member profile associated with a reference in a publication is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method describe herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate that member's connection to other members of the social network. A member profile may also include or be associated with comments or endorsements from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members who are connected in the context of a social network may be termed each other's "connections."

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information provided by the member's connections. Information provided by the member's connections may be, e.g., recommendations, endorsements and skills.

When a member of an on-line social network is mentioned in a news article, it may be of value to provide other members of the on-line social network with a notification of this event, as the members of a social network may desire to keep abreast of the significant events in the professional lives their connections. Method and system are provided to determine a member profile associated with a reference to a person in a publication. The method and system may be used beneficially to identify members of a social network in news articles, select the most valuable articles featuring that member, and then send a notification to the connections of that member. A system to identify members of a social network in news articles may be termed a news distribution system. For the purposes of this description the phrases "news article," "electronic publication," "publication," "web page," and "web content" may be used interchangeably to designate content that can be shared electronically via the World Wide Web.

A publication, such as an on-line news article, may enter a social networking system when it is shared with the social network by a member of the social network (e.g., via a "share" control or plugin provided on the associated web page). A news distribution system that may be provided with the on-line social networking system may scrape the web page containing the news article and determine whether it has a reference to a person who may be a member of the associated on-line social networking system. The news distribution system first extracts name entities from the web page. A name entity is an alpha-numeric string that may be a name of a person. For each name entity, the news distribution system discovers member profiles that are identified by a name that matches the name entity. If there is more than one member profile identified by a name that matches the name entity, these profiles are collected into a candidate set (also termed a set of candidate profiles). The news distribution system then employs a variety of disambiguation techniques to determine, which one of the candidate profiles corresponds to the name referenced in the news article. Once it has been established that the news article indeed contains a reference to a particular member of the social networking system, the news distribution system sends a notification to those members of the on-line social networking system who are connections of the member represented by the member profile. The notification may state that the particular member has been featured in the news and may also include a link to the publication.

In one example embodiment, the method to determine a member profile associated with a reference in a news article leverages the full social graph for the purposes of entity disambiguation, and also may leverage information about other entities available within the social networking system, such as, e.g., information about companies, academic institutions, etc. In one example embodiment, the method system may provide functionality listed below.

News Ingestion: Getting news articles into our system
Name entity Recognition: Identifying names of people in a news article
Entity Disambiguation: Identifying the entity corresponding to a name appearing in the news article
Ranking members in a news article by importance (vis-á-vis the article)
News article clustering and de-duping: Cluster articles together and pick best article from cluster
Delivery of "Your Network In The News" notifications to customers: Utilize various modes of distribution and consumption An example method and system determine a member profile associated with a reference in a publication may be implemented in the context of a network environment 100 illustrated in FIG. 1. As shown in FIG. 1, the network environment 100 may include client systems 110 and 120 and a server system 140. The server system 140, in one example embodiment, may host an on-line social networking system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152. The information about other entities available within the social networking system, such as, e.g., information about companies, academic institutions, etc., may also be stored in the database 150.

The client systems 110 and 120 may run respective browser applications 112 and 122 and may have access to the server system 140 via a communications network 130. The communications network 130 may be a public network (e.g., the Internet, a mobile communication network, or any other network capable of communicating digital data). As shown in FIG. 1, the server system 140 also hosts a news distribution system 144. In one example embodiment, the news distribution system 144 is configured to determine a member profile associated with a reference in a publication. In one example embodiment, the news distribution system 144 detects a publication (e.g., a web page containing a news article), extracts name entities from the web page, and determines whether any of the name entities match or correspond to a member profile in the on-line social networking system, utilizing various disambiguation techniques that leverage information provided as part of the member profiles in the on-line social networking system 142, as well as data captured by the on-line social networking system 142 with respect to interactions and connections among the members and with respect to other entities available within the social networking system, such as companies, events, etc. The news distribution system 144 may also be configured to send a notification to those members of the on-line social networking system 142 who are connections of the member represented by the member profile. As mentioned above, the notification may state that the particular member has been featured in the news and may also include a link to the publication.

Figure 2:
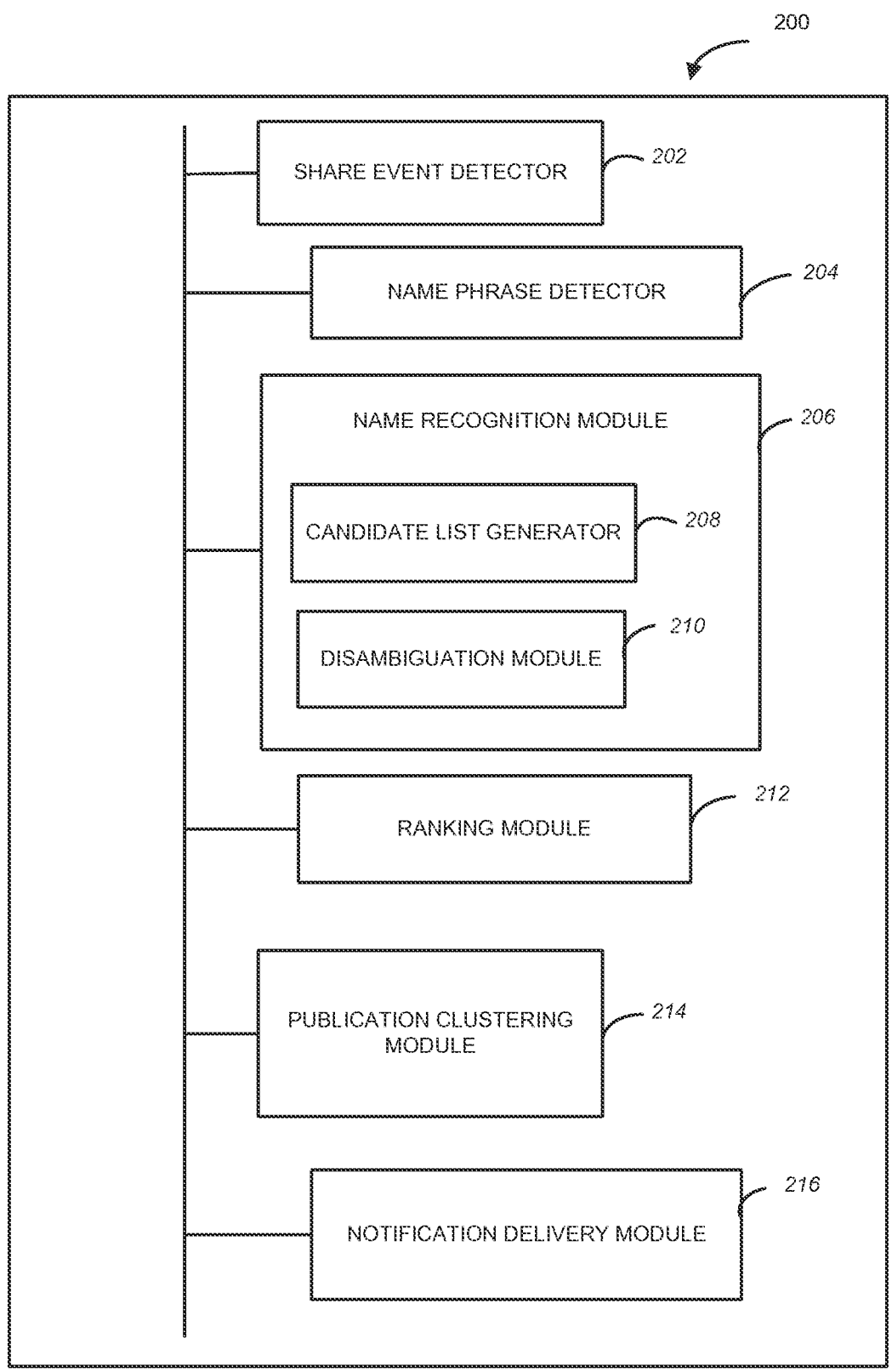
FIG. 2 is block diagram of a system to determine a member profile associated with a reference in a publication, in accordance with one example embodiment.

A news capturing system 146, also shown in FIG. 2 as cooperating with the on-line social networking system 142 and the news distribution system 144, may be configured to capture on-line publications as they are being shared by members of the on-line social networking system 142, e.g., via a "share" control that may be provided with on-line publications. An example news distribution system is illustrated in FIG. 2.

FIG. 2 is a block diagram of a system 200 to determine a member profile associated with a reference in a publication, in accordance with one example embodiment. As shown in FIG. 2, the system 200 includes a share event detector 202, a name phrase detector 204, and a name recognition module 206. The name recognition module 206 may comprise a candidate list generator 208 and a disambiguation module 210. The modules of the system 200 may be implemented as software, hardware, or a combination thereof.

The share event detector 202 may be configured to detect that a publication was shared by a member of an on-line social networking system. A publication may be any electronic publication, e.g., a web page containing a news article. The sharing of a web page with an on-line social networking system community may be achieved by proving a web page with a "share" plugin associated with a specific on-line social networking system. In one embodiment, news articles enter an on-line social networking system when a member of the on-line social networking system clicks on the associated "share" plugin. This plugin may be presented on the web pages of many professional news web sites and blogs, all over the Internet. When the "share" plugin is clicked, the share event detector 202 detects that a publication was shared by a member of an on-line social networking system.

The name phrase detector 204 may be configured to analyze publications that enter the on-line social networking system and determine whether the publication includes a phrase that is a name of a person a name phrase. Such a name phrase, e.g., "John Doe," may be termed a "name entity" and is typically an alpha-numeric string. The name phrase detector 204 may utilize various name entity recognition (NER) techniques, such as, e.g., conditional random field (CRF), Hidden Markov Model (HMM), Syntactic Tree Matching, etc. The name phrase detector 204 may identify more than one name entity in a publication. Each of the identified name entities is analyzed by the name recognition module 206 in the context of the on-line social network and the publication itself. For the purposes of this description the name entities may be referred to as simply names.

The name recognition module 206 may be configured to identify a member profile in the on-line networking system that represents a member who is referenced by the name entity found in the publication by the name phrase detector 204. In one embodiment, for each of the names identified in the publication by the name phrase detector 204, the name recognition module 206 determines whether the name is that of a member of the on-line social networking system. The process of determining whether the name is that of a member of the on-line social networking system may comprise two stages. During the first stage, a candidate list generator 208 selects one or more candidate profiles from the member profiles in the on-line social networking system, based on the name entity. The candidate list generator 208 generates a list of those member profiles that have the member's name matching the name detected in the publication, as there may be multiple members on the on-line social networking system that have the same name as the name found in the publication by the name recognition module 206. This list of those member profiles that have the member's name matching the name detected in the publication may be termed a "candidate set" or a list of candidate profiles. The next stage is determining whether the name appearing in the publication is indeed referencing a member represented by a member profile in the candidate set. The determining of whether the name appearing in the publication is indeed referencing a member represented by a member profile in the candidate set, in one example embodiment, is performed by the disambiguation module 210. The disambiguation module 210 is configured to utilize a machine learning classifier to classify each candidate profile from the candidate set as a "match" or "not-a-match," with respect to the name entity in the publication. An example publication may be an on-line news article. The machine learning classification technique may be, e.g., a Support Vector Machine (SVM) or any other machine learning classification technique.

Some of the features provided to the machine learning classifier to be used for entity disambiguation are derived from profile data shared by members of the on-line social networking system as well as the associated connections data, as described below. For example, one type of data derived from candidate profiles is employer information of the associated member. Often, in professional news, if a person is mentioned in a news article, the company associated with that person is also mentioned. The presence of a reference to an employer associated with a candidate profile may be regarded as an indicator of a potential match. Additionally, the absence of a reference to an employer associated with the candidate profile in the news the article may be regarded as an indicator that the person referenced in the article is not a member represented by the candidate profile.

The disambiguation module 210 may also use a so-called rank of a candidate profile. A rank of a member profile is a measure of the authority or popularity of a candidate profile. A rank of a member profile may be determined based on the professional connections of the candidate profile, and the authority or popularity of those connections. To determine a rank of a member profile, an algorithm may be used similar to the page-rank algorithm. The page-rank algorithm is a link analysis algorithm that assigns a numerical weight to each element of a hyperlinked set of documents with the purpose of measuring its relative importance within the set. In applying such algorithm to a set of member profile, a CxO (a chief officer) of a company is likely to have a higher rank value determined by a ranking algorithm, than a rank-and-file employee, since a CxO is likely to be connected to other high profile CxOs. It is also assumed that a CxO of a company has a higher likelihood of appearing in a news article, than a rank-and-file employee. The disambiguation module 210 thus leverages, at an aggregate level, metadata about connections of a member profile for the purpose of disambiguation.

Another type of data determined and used by the disambiguation module 210 is the similarity between a candidate profile page and the news article. The disambiguation module 210 gathers the textual information provided in a candidate profile page, and converts it into a document (a candidate document). The candidate document is then converted into a Vector Space Model. The disambiguation module 210 then computes a TF-IDF (Term Frequency Inverse Document Frequency) weighted Cosine Similarity between the candidate's document and the news article. (It will be noted, that this similarity metric is replaceable with other document similarity metrics.) The higher is the similarity value, the higher the probability that the name entity in the article corresponds to a member represented by the candidate profile. The similarity metric that represents similarity between the candidate document and the news article depends upon the number of discriminating words that appear both in the news article and the candidate profile page, as determined by the IDF weighing scheme. The higher this number, higher the probability that the person in the article is a match for our candidate.

Often, the name of a person and the name of a company may appear together in the same article. However, there may not be any strong association (such as employer employee) between the person referenced in the article and the company that is also mentioned in the article. Also, a news article may contain the name of a person and references to multiple companies, where each of the mentioned companies may have an employee with the same name. This makes it more difficult to identify the company associated with the person referenced in the article. In one embodiment, the disambiguation module 210 is configured to establish whether there is an association between a person's name appearing in the article and a company's name that is also appearing in the article. A simple measure that may be used as one of the indicators of whether there is an association between the person referenced in the article and the company that is also mentioned in the article is the shortest distance between the name of the person and the name of the company in the article. The distance may be measured as the number of characters between the name of the person and the name of the company in the article. For example, if the name of the person and the name of the company appear in the same sentence in the article, there is a strong likelihood that there is a strong association between the person and the company. However, if the person's name and the company's name appear in completely different paragraphs, separated by many lines of text in between, it is increasingly unlikely that the person mentioned in the article is associated with the company mentioned in the article.

The disambiguation module may also be configured to measure the association between a person's name appearing in the article and a company's name appearing in the article. Suppose there is a candidate profile A indicating the member represented by this profile is working for company B, and the names of both A and B appear in the article. It may be inferred that if there is another company's name appearing between the names of A and B, the probability that person A and company B are associated with each other is decreased. Utilizing a similar rationale, it may be inferred that if there is another person's name appearing between the names of A and B, the probability that person A and company B are associated with each other is decreased.

If the name appearing in an article is not a common name, the possibility of a false positive match goes down, simply because there are fewer individuals with that name and thus fewer candidate profiles for a false positive match. The exact opposite may be assumed to be true if the name is a common name. In one embodiment, the disambiguation module 210 may be configured to compute the popularity of a name, e.g., counting the number of member profiles in the social networking system that are identified by that name.

Another feature that may be utilized by the disambiguation module 210 is the presence, in the news article, of a job title matching the job title of a member listed in a candidate profile. If the job title listed in a candidate profile appears in the article, there is a higher likelihood that the candidate profile corresponds to the person's name in the article. However, job titles that appear on a candidate's profile and the job title appearing in the news article may not always be an exact textual match, even if they are referring to the same job. For example, the words CEO and Chief Executive refer to the same job title, but are not exact textual matches. Thus, to make the job title match robust, the disambiguation module 210 may leverage standardized job titles. In one embodiment, the disambiguation module 210 leverages a data set that maps similar job titles that have differing string representations to the same job title ID. The standardization of job titles leverages data mining principles applied on the millions of job titles that may be present on the profile pages of the social networking system. The disambiguation module 210 may also calculate the distance between the job title and the name in the article and use the calculated distance as a measure of the association between the job title appearing in the article and the name referenced in the article. The smaller the distance between the job title appearing in the article and the name referenced in the article, the stronger is the association.

Often, in professional news, a news article references several persons who are working on the same project. For example, if a product is launched, the key contributing individuals from the product's team may appear in the same news article. Thus, it may be inferred that if multiple names appear in a news article, they are possibly professionally connected to each other. Thus, if a candidate profile from the candidate set is connected to another member profile identified by name in the news article, the disambiguation module 210 may treat it as a factor that increases the probability of a match. The disambiguation module 210 may also take into account the connection strength between the candidate profiles identified by respective names referenced in the news article. The stronger the connection strength, the stronger is the likelihood of a match. Connection strength between two connected members depends upon multiple factors. One of the factors that determine connection strength is the number of interactions between the two members in the social network, such as mails, messages, shared connections, etc.

The size of a firm or a company may also be an indicator of who is likely to appear in a news article that references that firm. For example, for a large firm, senior officials or designated public relations individuals are more likely to appear in news articles. However, for small firms, the above observation may not always be true. Thus, the disambiguation module 210 may utilize the size of a firm or a company references in a news article to determine whether a candidate profile corresponds to the name referenced in a publication.

Thus, in one embodiment, the disambiguation module 210 may use at least one or more of the features derived from member profiles in a social networking system, as listed below.

An employer name from a candidate profile referenced in the news article

Rank—a measure of the authority or popularity of a candidate profile

Similarity between a candidate profile page and the news article

The distance between employer name and the name entity in the news article

The number of other companies referenced in the article between the company name and the person's name The number of other people's names between the company name and the person's name Popularity of the name The presence, in the news article, of a job title matching the job title of a member listed in a candidate profile The distance between the job title and the name in the article Connections with other people referenced in the article The size of employer associated with the candidate profile It will be noted, that the specific features that are being leveraged for name entity disambiguation may depend upon the specific types of data collected in the member profiles of a social networking system. In addition to the data supplied directly by a member to the on-line social networking system, the disambiguation module 210 may use information acquired or generated by the on-line social networking system in the course of the member participating in the on-line social networking. For example, the disambiguation module 210 may leverage in formation about the member's professional relationships to determine if the member is the person who is references in the news article. The connections of a member in the on-line social networking system may be termed a social graph of a member (or a professional graph if the social networking system is a professional network). The disambiguation module 210 may be configured to utilize not only a member's professional graph, but also the global professional graph, and to take into consideration not only data with respect to the direct connections of the member, but also data related to the connections of the member's connections, etc. The disambiguation module 210 may also be configured to utilize metadata about other entities that a member is associated with, such as information about past and current employers (e.g., companies) listed in the member profile.

Returning to FIG. 2, the system 200 also includes a ranking module 212. A news article may reference several names that correspond to members of an on-line social network. Some of these people referenced by name in the article may be the primary focus of the article (let us call them the "Star Cast" of the article). Whereas another person or persons may only get a brief mention and are ancillary to the primary focus of the article (let us call them the "Supporting Cast" of the article). If a person is part of the "supporting cast," it is not as valuable for a connection of that member to know that he/she was featured in the news article. Whereas, for connections of the "Star Cast," it is very valuable information. The ranking module 212 may be configured to rank the names appearing in the article by their order of importance with respect to the information related in the news article. The ranking module 212 may utilize a machine learning algorithm such as, e.g., RankBoost algorithm from the "Learning to Rank" family of algorithms. In one embodiment, or each name (name entity corresponding to a member of a social network) that appears in the news article the ranking module 212 determines the number of times the name of a person appears in the article, the number of times the company associated with the name appeared in the article, and the similarity between document and profile page of the corresponding member. These features are then used by the machine learning algorithm utilized by the ranking module 212. The training data for the machine learning algorithm, such as RankBoost, consists of "pairwise preferences." A "pair-wise preference" is a pair of results, where it is specified which result is be ranked higher than the other. In one embodiment, the determined ranking is used after the disambiguation step to determine whether or not to send a notification to connections of a member corresponding to a name mentioned in the article. For example, if the ranking of a name mentioned in the article is below or above a predetermined threshold value, a notification is not sent to the respective member's connections.

Also shown in FIG. 2 is a publication clustering module 214. Often when a newsworthy event occurs, multiple news publications will publish news articles about the same event. The publication clustering module 214 may be configured to determine that the same member of the on-line social networking system is referenced in several news articles describing the same news event. It may not be desirable for the aforementioned member's connections to know about every news article describing the same event. Thus, the publication clustering module 214 clusters the news articles that describe the same news event and also reference the member of the on-line social networking system. The publication clustering module 214 then selects, from the cluster of similar news articles one article that is to be delivered to the member's connections with a notification that the member was mentioned in the news. The publication clustering module 214 makes the determination of which publication is to be selected from the cluster, based on the reputation of the source of the news article, the quality rank of the article, and the rank of the member with respect to the article. The reputation of the source of the article may be determined by computing a reputation score based upon the number of times a member of the on-line social network have liked, shared or commented upon any article published by that source. The members' interactions with the source are thus used as their proxy vote for the reputation of the source of the news article. The quality rank of the news article may be determined by computing features based upon the structure of the article, such as usage of good paragraphs, images, charts and graphs, etc. The rank of the member in the article may be determined, as described above, based on the professional connections of the member profile, and the authority or popularity of those connections.

In order to remove the duplicate news articles from the on-line social networking system, an algorithm, such as SpotSigs, may be used for extracting and matching signatures of near duplicate web pages. For each of the news article is the on-line social networking system, the summary and the body text of the article is scanned, and n-grams with specified leading anchor words are extracted and used as spot-signatures for the article. The publication clustering module 214 then computes the Generalized Jaccard similarity of the spot signatures between the article and the rest of the article corpus. Any two articles whose similarity threshold passed a predetermined threshold (that can be manually tuned) are grouped into the same duplication cluster.

A notification delivery module 216 shown in FIG. 2 may be configured to deliver a notification to a member's connection whenever the member is mentioned in a news article. The notification may be titled "Your Network In the News" and may be delivered to connections of the members of an on-line social networking system by various means, such as, e.g., the news feed on the homepage of the on-line social networking site, in a daily email digest that contains interesting information about the member's connections' recent activities, in a weekly email digest containing news that is relevant to the member, as a push notification on mobile devices for instant updates, etc.

Figure 3:
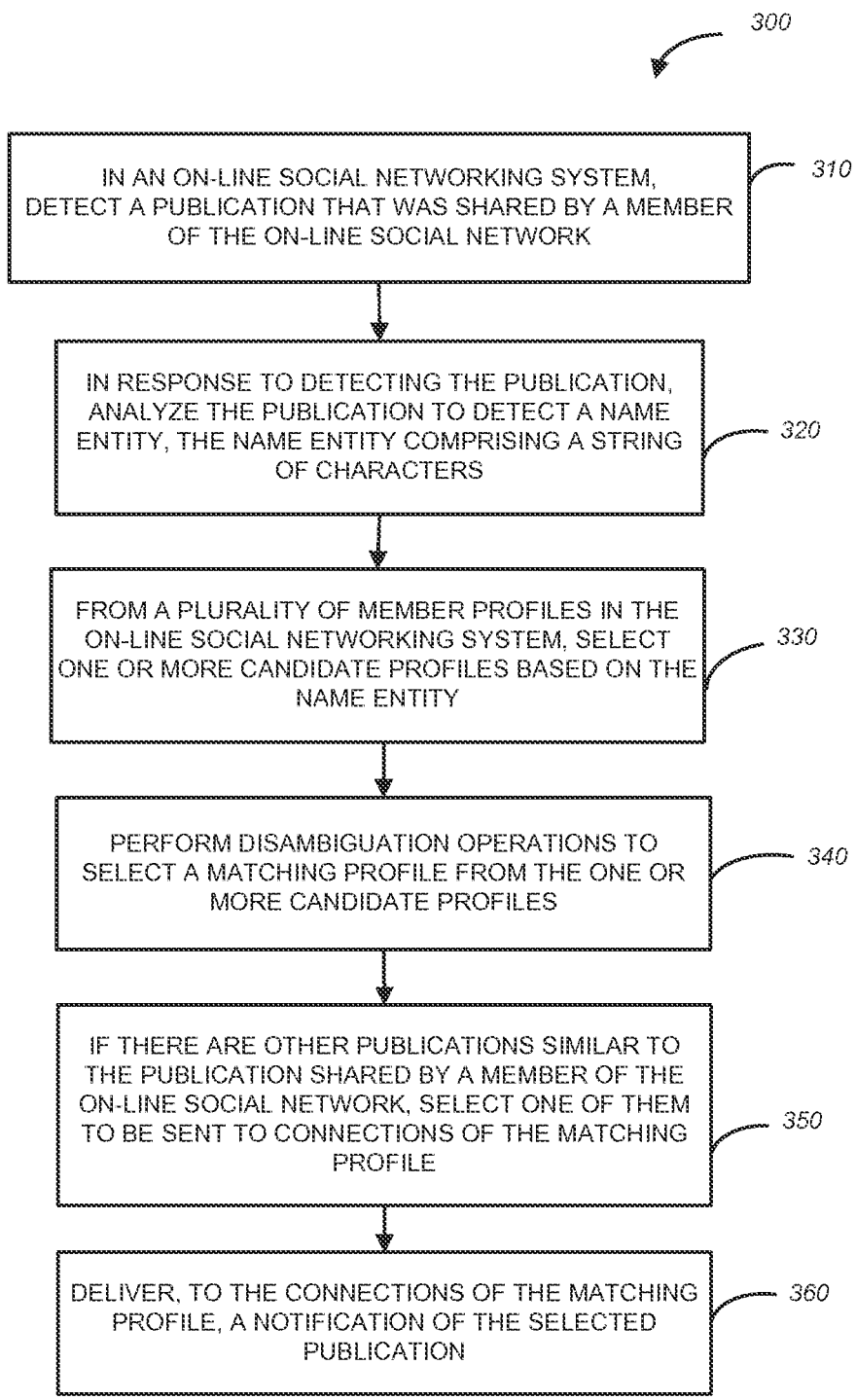
FIG. 3 is a flow chart of a method to determine a member profile associated with a reference in a publication, in accordance with an example embodiment.

FIG. 3 is a flow chart of a method 300 to determine a member profile associated with a reference in a publication, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the share event detector 202 of FIG. 2 detects a publication that was shared by a member of an on-line social networking system. At operation 320, the name phrase detector 204 of FIG. 2 analyzes the publication to detect whether the publication includes a reference that matches the name of any of the members of the social networking system. Such reference, e.g., a name "John Doe," may be termed a "name entity" and is typically an alpha-numeric string. As mentioned above, the name phrase detector 204 may utilize various name entity recognition (NER) techniques, such as, e.g., conditional random field (CRF), Hidden Markov Model (HMM), Syntactic Tree Matching, etc. As the name phrase detector 204 may identify more than one name entity in a publication, each of the identified name entities is analyzed by the name recognition module 206 of FIG. 2 in the context of the on-line social network and the publication itself.

At operation 330, a candidate list generator 208 of FIG. 2 selects one or more candidate profiles from the member profiles in the on-line social networking system, based on the name entity. At operation 340, the disambiguation module 210 of FIG. 2 performs disambiguation operations to select a matching profile from the candidate profiles. The matching profile is a profile that was identified as corresponding to the person referenced in the publication by name (name entity). As explained above, the disambiguation module 210 may be configured to utilize a machine learning classifier (e.g., a Support Vector Machine (SVM)) to classify each candidate profile from the candidate set as a "match" or "not-a-match," with respect to the name entity in the publication. An example publication may be an on-line news article.

As described above the publication clustering module 214 of FIG. 2 may be configured to determine that the same member of the on-line social networking system is referenced in several news articles describing the same news event and selects one of them to be sent to connections of the matching member profile. As it may not be desirable for the member's connections to know about every news article describing the same event the publication, the clustering module 214 clusters the news articles that describe the same news event and also reference the member of the on-line social networking system. At operation 350, the publication clustering module 214 selects, from the cluster of similar news articles one article that is to be delivered to the member's connections with a notification that the member was mentioned in the news. At operation 360, the notification delivery module 216 of FIG. 2 delivers a notification of the publication to connections of the matching profile. As mentioned above, the notification may be titled "Your Network In the News" and may be delivered to members of the members of an on-line social networking system by various means, such as, e.g., news feed, email, or a push notification on mobile devices.

Figure 4:
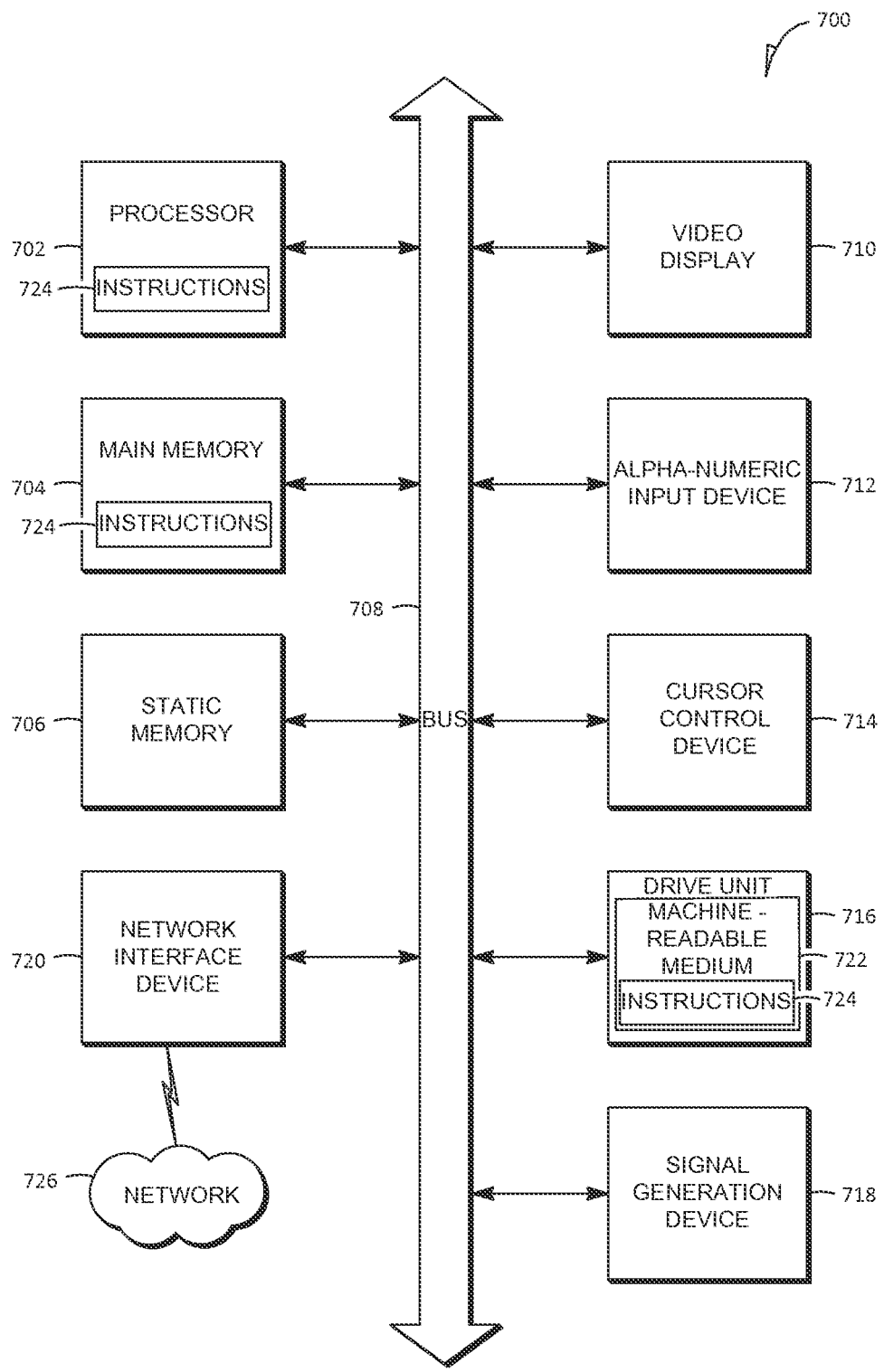
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to determine a member profile associated with a reference in a publication has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
   detecting a publication that was shared by a member of an on-line social networking system;
   determining that the publication includes a name entity, the name entity comprising a string of characters;
   selecting one or more candidate profiles from a plurality of member profiles in the on-line social networking system, based on the name entity;
   selecting a matching profile from the candidate profiles, utilizing one or more disambiguation techniques, the one or more disambiguation techniques comprising utilizing data from a candidate profile from the one or more candidate profiles;
   identifying, using at least one processor, the matching profile from the candidate profiles as a member profile in the on-line social networking system that represents a member referenced by the name entity; and
   delivering a notification of the publication to members represented by the respective one or more profiles of connections of the candidate profile.

2. The method of claim 1, wherein the utilizing of the one or more disambiguation techniques comprises utilizing data from one or more profiles of connections of the candidate profile.

3. The method of claim 2, wherein the one or more disambiguation techniques comprises determining whether a candidate profile from the one or more candidate profiles is connected to a further member profile that is identified by name in the publication, the further member profile being from the member profiles in the on-line social networking system.

4. The method of claim 2, wherein the one or more disambiguation techniques comprises determining a rank of the candidate profile, based on connections of a candidate profile from the one or more candidate profiles in the on-line social networking system.

5. The method of claim 2, wherein the one or more disambiguation techniques comprises examining data from a candidate profile that is indicative of an employer of a member represented by the candidate profile.

6. The method of claim 2, wherein the one or more disambiguation techniques comprises utilizing data about an employer listed in a candidate profile from the one or more candidate profiles.

7. The method of claim 1, comprising determining a rank of the name entity corresponding to the member of the on-line social networking system with respect to other name entities corresponding to other members of the on-line social networking system referenced in the publication, the rank being with respect to the publication.

8. The method of claim 1, comprising:
   detecting one or more further publications similar to the publication;
   clustering the one or more further publications with the publication; and
   selecting an article from the clustered publications for delivery to one or more members of the on-line social networking system.

9. The method of claim 1 comprising delivering a notification of the publication to connections of the member profile.

10. The method of claim 9, wherein the delivering is utilizing one or more of a news feed in the on-line social networking system, email, or a push notification on mobile devices associated with respective connections of the member profile.

11. A computer-implemented system comprising:
a share event detector, implemented using at least one processor, to detect a publication that was shared by a member of an on-line social networking system;
a name phrase detector, implemented using at least one processor, to determine that the publication includes a name entity, the name entity comprising a string of characters;
a candidate list generator, implemented using at least one processor, to select one or more candidate profiles from a plurality of member profiles in the on-line social networking system, based on the name entity; and
a disambiguation module, implemented using at least one processor, to select a matching profile from the candidate profiles, utilizing one or more disambiguation techniques, the one or more disambiguation techniques comprising utilizing data from a candidate profile from the one or more candidate profiles;
a name recognition module, implemented using at least one processor, to identify the matching profile from the candidate profiles as a member profile in the on-line social networking system that represents a member referenced by the name entity; and
a notification delivery module, implemented using at least one processor, to deliver a notification of the publication to members represented by the respective one or more profiles of connections of the candidate profile.

12. The system of claim 11, wherein the disambiguation module is to utilize data from one or more profiles of connections of the candidate profile.

13. The system of claim a wherein the one or more disambiguation techniques comprises determining whether a candidate profile from the one or more candidate profiles is connected to a further member profile that is identified by name in the publication, the further member profile being from the member profiles in the on-line social networking system.

14. The system of claim 12, wherein the one or more disambiguation techniques comprises determining, based on connections of the candidate profile in the on-line social networking system, a rank of a candidate profile from the candidate profiles.

15. The system of claim 12, wherein the one or more disambiguation techniques comprises examining data from a candidate profile that is indicative of an employer of a member represented by the candidate profile.

16. The system of claim a wherein the one or more disambiguation techniques comprises utilizing data about an employer listed in a candidate profile from the one or more candidate profiles.

17. The system of claim 11, comprising a ranking module to determine, using the at least one processor, a rank of the name entity corresponding to the member of the on-line social networking system with respect to other name entities corresponding to other members of the on-line social networking system referenced in the publication, the rank being with respect to the publication.

18. The system of claim 11, comprising a publication clustering module to detect, using the at least one processor, one or more further publications similar to the publication; cluster the one or more further publications with the publication, and to select an article from the clustered publications for delivery to one or more members of the on-line social networking system.

19. The system of claim 11 comprising a notification delivery module to deliver, using the at least one processor, a notification of the publication to connections of the member profile.

20. A machine-readable non-transitory storage medium having instruction data to cause a machine to perform operations comprising:
detecting a publication that was shared by a member of an on-line social networking system;
determining that the publication includes a name entity, the name entity comprising a string of characters;
selecting one or more candidate profiles from a plurality of member profiles in the on-line social networking system, based on the name entity;
selecting a matching profile from the candidate profiles, utilizing one or more disambiguation techniques, the one or more disambiguation techniques comprising utilizing data from a candidate profile from the one or more candidate profiles;
identifying, using at least one processor, the matching profile from the candidate profiles as a member profile in the on-line social networking system that represents a member referenced by the name entity; and
delivering a notification of the publication to members represented by the respective one or more profiles of connections of the candidate profile.

* * * * *

UNITED STATES PATENT AND TRADEMARK OFFICE
CERTIFICATE OF CORRECTION

PATENT NO. : 9,438,689 B2
APPLICATION NO. : 14/494271
DATED : September 6, 2016
INVENTOR(S) : Iyer et al.

It is certified that error appears in the above-identified patent and that said Letters Patent is hereby corrected as shown below:

In the Claims

In Column 15, Line 39, in Claim 13, delete "a" and insert --12,--, therefor

In Column 16, Line 5, in Claim 16, delete "a" and insert --12,--, therefor

In Column 16, Line 18, in Claim 18, delete "publication;" and insert --publication,--, therefor Signed and Sealed this
Sixth Day of March, 2018

Andrei Iancu
*Director of the United States Patent and Trademark Office*